Nov. 8, 1927.
G. W. DOVER
1,648,380
TOOL HOLDER
Filed Sept. 10. 1924
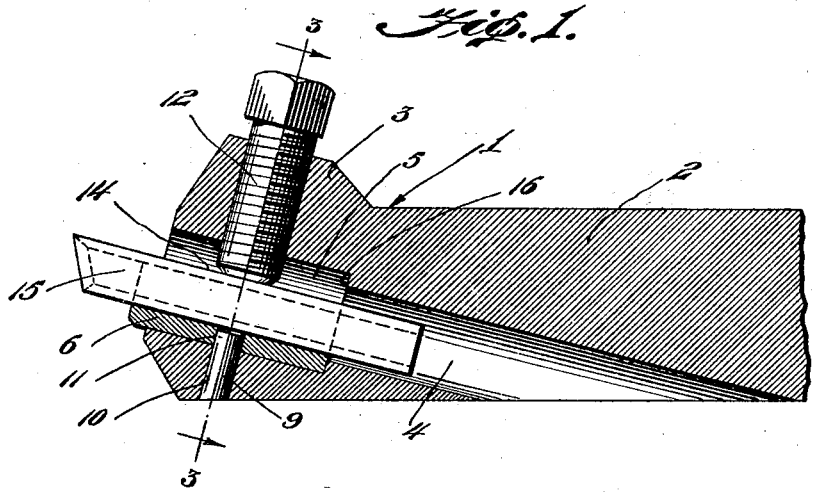
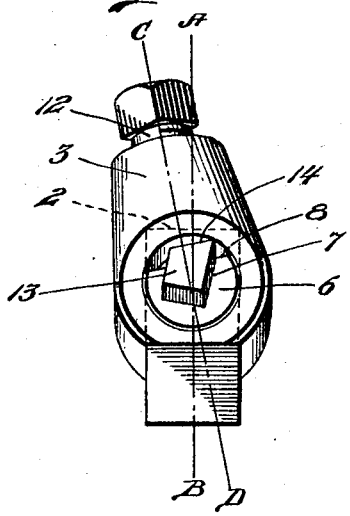
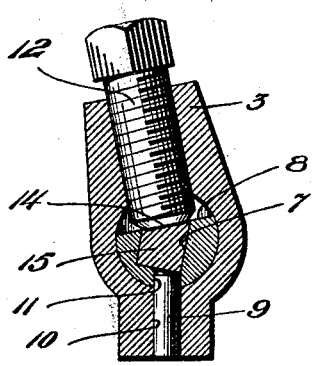
Inventor
George W. Dover
By Perley H. Plant
Attorney Patented Nov. 8, 1927.

1,648,380

UNITED STATES PATENT OFFICE.

GEORGE W. DOVER, OF LONGMEADOW, RHODE ISLAND, ASSIGNOR, BY DIRECT AND MESNE ASSIGNMENTS, TO THE MONTGOMERY TOOL AND MACHINERY COMPANY, A CORPORATION OF RHODE ISLAND.

TOOL HOLDER.

Application filed September 10, 1924. Serial No. 737,015.

This invention relates to a tool holder such as is particularly adapted for holding a metal cutting tool in lathes, shapers and the like.

The principal object of the present invention is to provide a tool holder of simple construction, the parts of which can be readily and easily made, and which is adapted to firmly clamp the cutting tool in such a manner as to securely hold the same against angular movement while the tool engages the work.

Another object of the invention is to provide a construction in which a tool rectangular on three sides and having its remaining side inclined may be forced in a slightly angular direction into a rectangular groove whereby angular movement or "chattering" of the cutting tool is prevented.

Another object of the invention is the provision of a structure wherein the cutting tool is automatically and positively located in the proper cutting position when inserted in the holder and firmly held against movement from that position.

Other objects and advantages of the invention relate to certain improved details of construction and methods of operation as will be more fully set forth in the detailed description to follow.

Referring to the accompanying drawings forming a part of this application:—

Fig. 1 is a vertical longitudinal sectional view through the tool holder showing the position of the cutting tool therein.

Fig. 2 is an end elevational view of the tool holder, and,

Fig. 3 is a vertical transverse sectional view taken along the line 3—3 of Fig. 1.

In the manufacture of tool holders of the character described, various expedients have been adopted for the purpose of permitting adjustment of the cutting tool and forming the holder in such a manner as to take a rectangular cutting tool without broaching an opening for the same, but so far as I am aware all such holders are objectionable in that they fail to hold the cutting tool firmly against movement when in operation and the cutting tool is also liable to rotate slightly whereby the cutting edge is turned somewhat out of its proper position and the correct operation of the same prevented.

In the structure shown herewith 1 designates the tool holder generally which is provided with a shank portion 2 and a head portion 3. A passage 4 extends in an angular direction through the holder, the forward portion of which passage is enlarged as indicated at 5 for the reception of a bearing block 6 which is substantially semi-circular in cross sectional outline and which is provided with a rectangular groove 7 formed upon the flat face 8 thereof, the rectangular groove 7 being so formed in the bearing block 6 that it is tilted or inclined somewhat relative to the flat face 8 of the bearing block as shown in Figs. 2 and 3 of the drawings.

A pin 9 is inserted in suitable registering openings 10 and 11 formed in the base of the holder and the bearing block respectively for firmly holding the bearing block against rotation. The openings 10 and 11 are properly formed to locate the bearing block in proper angular position to so position the cutting tool as to maintain the cutting edge at the correct angle for the desired purpose.

The head portion 3 of the holder is formed at a slight angle to the vertical plane of the shank 2 as shown in Fig. 2 of the drawings, in the structure shown the head portion being tilted to the left of the plane of the shank for a right-handed cutting tool holder, although it is to be understood that the head portion would be tilted in the opposite direction relative to the vertical plane of the shank to provide a left handed cutting tool holder.

A screw 12 is threaded in the head portion 3 of the holder, the screw being tilted or inclined relative to the vertical plane of the shank portion in order that it may bear squarely upon the upper face 14 of the cutting tool 15. The line A—B indicates the vertical plane of the shank and C—D designates the axis of the screw 12 on Fig. 2 of the drawings.

The bearing block 6 may extend into the enlarged portion 5 of the passage 4 a sufficient distance to bear against the shoulder 16.

The cutting tool 15 is substantially rectangular in cross-section upon three sides, the upper face 14 being properly inclined to give the correct cutting angle. It will be noted that the inclined upper face of the cutting tool corresponds substantially with the inclination of the flat face 8 of the bearing block whereby these surfaces substantially correspond with each other when the parts are in assembled position. The axis of the screw 12 is inclined relative to the vertical plane of the shank 2 to the same degree that the upper face 14 of the cutting tool is inclined to one side thereof thus resulting in the screw 12 bearing upon the cutting tool at right angles to the upper surface 14 thereof.

In the use of the ordinary rectangular cutting tool it is necessary to grind off an angular portion from one side of the cutting tool to form a proper clearance angle and to grind off a similar angular portion from the upper face of the cutting tool to form a second clearance angle.

The grinding of these clearance angles throughout the entire effective length of the tool involves considerable time and expense which is entirely overcome by the production of a cutting tool of the form illustrated herein where the cross-section of the cutting tool is in the form of a trapezoid having two of its adjacent angles right angles, or in other words the cutting tool is rectangular on three sides with its fourth or top side inclined relative to the base. The angle of inclination of the top face of the tool relative to the base is substantially equal to the sum of the two clearance angles above described. In this way by tilting the cutting tool to the necessary degree to give proper side clearance the top of the cutting tool will be so positioned as to give a proper clearance for turning the metal removed.

It will be seen, therefore, that my improved tool holder provides a structure wherein a bearing may be provided for a rectangular cutting tool without the trouble and expense of broaching an opening for the reception of the same. The bearing block 6 being pinned to the holder is positively prevented from rotation thus insuring proper positioning of the cutting edge at all times and obviating the necessity of the operator adjusting the cutting tool before each operation.

The rectangular groove 7 in the bearing block being tilted or inclined relative to the vertical plane of the shank, and the screw 12 being also inclined to the same degree relative to the vertical plane of the shank causes the screw 12 to bear squarely upon the upper surface of the cutting tool and forces the cutting tool downward into the lower edge of the groove thus firmly holding the cutting tool in position so that the strain of cutting will not move or rotate the cutter in the slightest degree and insure that the cutting edge of the tool will always be in the proper angular position for operation.

The three longitudinal faces of the cutting tool which lie adjacent to the three sides of the rectangular groove 7 when the cutting tool is positioned therein are rectangular, that is, each is located at right angles to the adjacent face, and the fourth longitudinal face 14 of the cutting tool is inclined with respect to the intermediate of said three longitudinal faces. The end 13 of the cutting tool is ground at an inclination to form a cutting edge along the line it makes with the inclined longitudinal face 14 of the cutting tool. In the use of tools of this character it has been necessary heretofore for the workman to grind three clearance angles, namely at the top, side and front end of the cutting tool. By forming the cutting tool with an inclined longitudinal face 14 and properly positioning the same in the tool holder the necessity for grinding the top clearance and side clearance angles is obviated, and a tool is provided which is capable of being used without grinding except for the grinding of the front clearance angle at the end of the cutting tool. In positioning the cutting tool in the holder it will be seen that the same is tilted or inclined somewhat from the vertical, whereby the cutting tool is so positioned that upon tightening the screw 12 two of the rectangular longitudinal sides of the cutting tool are forced into intimate contact with the base and one side face of the groove 7 to hold the tool firmly against movement, and at the same time so incline the tool as to provide a side clearance angle as well as a top clearance angle.

What I claim is:—

1. A tool holder provided with a shank portion and a head portion inclined relative to the vertical plane of the shank portion, said holder being provided with a circular tool receiving passage, a segmental bearing block located in said passage and provided with a rectangular groove tilted with respect to the upper face of said block, means for retaining said bearing block in a predetermined position within said passage, a cutting tool fitting in said rectangular groove, and a clamping screw threaded in the head portion of said holder and bearing directly upon the upper face of said cutting tool to firmly secure the same against rotative movement.

2. A tool holder including a shank portion and a head portion and provided with an opening of circular cross-section, a bearing block of segmental cross-section fixedly secured within said opening and provided upon its plane face with a rectangular groove inclined relative to the plane of the block, a cutting tool positioned in said groove, and a screw threaded in said head portion and inclined relative to the vertical plane of said shank portion and bearing upon the upper face of said tool to force two sides of said tool firmly into contact with two sides of said groove and hold the tool firmly in cutting position.

3. A tool holder comprising a shank portion and a head portion and provided with a circular opening, a segmental bearing block positioned in said opening and held against rotative movement therein, said bearing block being provided with a rectangular groove and so positioned in said opening that the rectangular groove is inclined with respect to the horizontal, a cutting tool provided with three longitudinal rectangular faces, the fourth longitudinal face of said cutting tool being inclined relative to the plane of the intermediate rectangular face, said cutting tool being positioned in said groove with its inclined face located adjacent to the open side of said groove, and a screw threaded in said head portion and bearing against the inclined face of said cutting tool to hold the same firmly in cutting position.

In testimony whereof I have affixed my signature.

GEORGE W. DOVER.